(12) United States Patent
Faber et al.

(10) Patent No.: US 7,519,170 B2
(45) Date of Patent: *Apr. 14, 2009

(54) SYSTEMS AND METHODS FOR ARRANGING A CALL

(75) Inventors: Scott Faber, San Francisco, CA (US); Ron Hirson, San Francisco, CA (US); James D. Migdal, San Francisco, CA (US); Henrik Axel Ebbe Altberg, Mill Valley, CA (US); Sean David Van Der Linden, San Francisco, CA (US)

(73) Assignee: UTBK, Inc., Dover, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/026,488

(22) Filed: Feb. 5, 2008

(65) Prior Publication Data

US 2008/0212756 A1 Sep. 4, 2008

Related U.S. Application Data

(63) Continuation of application No. 10/460,776, filed on Jun. 12, 2003, now Pat. No. 7,359,498.

(51) Int. Cl.
*H04M 3/42* (2006.01)
(52) U.S. Cl. .............................. 379/210.01; 379/209.01
(58) Field of Classification Search ............ 379/209.01, 379/210.01; 705/9
See application file for complete search history.

(56) References Cited

U.S. PATENT DOCUMENTS

| | | | |
|---|---|---|---|
| 4,604,686 A | 8/1986 | Reiter et al. |
| 4,677,659 A | 6/1987 | Dargan |
| 4,741,025 A | 4/1988 | Maruyama et al. |
| 4,757,267 A | 7/1988 | Riskin |
| 4,796,293 A | 1/1989 | Blinken et al. |
| 4,817,129 A | 3/1989 | Riskin |
| 5,373,549 A | 12/1994 | Bales et al. |
| 5,436,957 A | 7/1995 | McConnell |
| 5,483,588 A | 1/1996 | Eaton et al. |
| 5,539,813 A | 7/1996 | Jonsson |
| 5,544,237 A | 8/1996 | Bales et al. |
| 5,559,875 A | 9/1996 | Bieselin et al. |
| 5,659,742 A | 8/1997 | Beattie et al. |
| 5,724,521 A | 3/1998 | Dedrick |
| 5,845,265 A | 12/1998 | Woolston |
| 6,535,506 B1 | 3/2003 | Narain et al. |
| 6,839,737 B1 | 1/2005 | Friskel |

(Continued)

OTHER PUBLICATIONS

Sterling, Greg, "Ingenio's Ether—Pay Per Professional Advice," Search Engine Journal, Mar. 3, 2006.

(Continued)

*Primary Examiner*—Harry S Hong
(74) *Attorney, Agent, or Firm*—Greenberg Traurig, LLP

(57) ABSTRACT

According to one embodiment of the present invention, a method of arranging a call with a service provider is disclosed. The method includes: determining whether the service provider accepts arranged calls; if it is determined that the service provider does not accept arranged calls, contacting the service provider to request arranged calls from the service provider; and if it is determined that the service provider accepts arranged calls, requesting an arranged call.

21 Claims, 4 Drawing Sheets

U.S. PATENT DOCUMENTS

| | | |
|---|---|---|
| 6,910,159 B2 | 6/2005 | Phillips et al. |
| 6,990,183 B2 | 1/2006 | Holland et al. |
| 7,013,280 B2 | 3/2006 | Davis et al. |
| 7,031,697 B2 | 4/2006 | Yang et al. |
| 7,046,782 B2 | 5/2006 | Miller |
| 7,224,781 B2 | 5/2007 | Jacob et al. |
| 7,249,045 B2 | 7/2007 | Lauffer |
| 7,359,498 B2 * | 4/2008 | Faber et al. ............ 379/210.01 |
| 2002/0069105 A1 | 6/2002 | do Rosario Botelho et al. |
| 2003/0041255 A1 | 2/2003 | Chen et al. |
| 2003/0140084 A1 | 7/2003 | D'Angelo |
| 2004/0038673 A1 | 2/2004 | Dunn et al. |
| 2004/0100497 A1 | 5/2004 | Quillen et al. |
| 2004/0193740 A1 | 9/2004 | Kasmirsky et al. |
| 2004/0199494 A1 | 10/2004 | Bhatt |
| 2006/0075104 A1 | 4/2006 | Kumer |
| 2007/0100799 A1 | 5/2007 | Rose et al. |

OTHER PUBLICATIONS

USPTO, Redacted Transaction History of U.S. Appl. No. 09/414,710, filed Oct. 8, 1999, entitled "System for Providing Services in Real-Time over the Internet," now abandoned.

USPTO, Redacted Transaction History of U.S. Appl. No. 09/488,130, filed Jan. 20, 2000, entitled "Method and Apparatus to Connect Consumer to Expert," now U.S. Patent No. 6,223,165.

USPTO, Redacted Transaction History of U.S. Appl. No. 09/733,872, filed Dec. 8, 2000, entitled "Assistance Method and Apparatus," now U.S. Patent No. 6,523,010.

USPTO, Redacted Transaction History of U.S. Appl. No. 09/782,925, filed Feb. 13, 2001, entitled "Assistance Method and Apparatus," now U.S. Patent No. 6,549,889.

USPTO, Redacted Transaction History of U.S. Appl. No. 09/782,984, filed Feb. 13, 2001, entitled "Assistance Method and Apparatus," now U.S. Patent No. 6,546,372.

USPTO, Redacted Transaction History of U.S. Appl. No. 10/107,743, filed Mar. 26, 2002, entitled "Assistance Method and Apparatus," now U.S. Patent No. 6,801,899.

USPTO, Redacted Transaction History of U.S. Appl. No. 10/951,502, filed Sep. 27, 2004, entitled "Method and System to Connect Consumers to Information," now U.S. Patent No. 7,249,045.

USPTO, Redacted Transaction History of U.S. Appl. No. 11/772,525, filed Jul. 2, 2007, entitled "Method and System to Connect Consumers to Information."

USPTO, Redacted Transaction History of U.S. Appl. No. 10/032,518, filed Dec. 27, 2001, entitled "Apparatus and Method for Scheduling Live Advice Communication with a Selected Service Provider."

International Application No. PCT/US00/10730, International Search Report, Jan. 3, 2001.

International Application No. PCT/US00/06849, International Search Report, May 16, 2000.

USPTO Transaction History of U.S. Appl. No. 09/414,710, filed Oct. 8, 1999, entitled "System for Providing Services in Real-Time over the Internet," now abandoned.

USPTO Transaction History of U.S. Appl. No. 09/488,130, filed Jan. 20, 2000, entitled "Method and Apparatus to Connect Consumer to Expert," now U.S. Patent No. 6,223,165.

USPTO Transaction History of U.S. Appl. No. 09/733,872, filed Dec. 8, 2000, entitled "Assistance Method and Apparatus," now U.S. Patent No. 6,523,010.

USPTO Transaction History of U.S. Appl. No. 09/782,925, filed Feb. 13, 2001, entitled "Assistance Method and Apparatus," now U.S. Patent No. 6,549,889.

USPTO Transaction History of U.S. Appl. No. 09/782,984, filed Feb. 13, 2001, entitled "Assistance Method and Apparatus," now U.S. Patent No. 6,546,372.

USPTO Transaction History of U.S. Appl. No. 10/107,743, filed Mar. 26, 2002, entitled "Assistance Method and Apparatus," now U.S. Patent No. 6,801,899.

USPTO Transaction History of U.S. Appl. No. 10/951,502, filed Sep. 27, 2004, entitled "Method and System to Connect Consumers to Information," now U.S. Patent No. 7,249,045.

USPTO Transaction History of U.S. Appl. No. 11/772,525, filed Jul. 2, 2007, entitled "Method and System to Connect Consumers to Information."

USPTO Transaction History of U.S. Appl. No. 10/032,518, filed Dec. 27, 2001, entitled "Apparatus and Method for Scheduling Live Advice Communication with a Selected Service Provider."

USPTO Transaction History of U.S. Appl. No. 08/702,833, filed Aug. 23, 1996, entitled "Method for Establishing Anonymous Communication Links," now U.S. Patent No. 5,907,677.

USPTO Transaction History of U.S. Appl. No. 10/923,396, filed Aug. 20, 2004, entitled "Gate Keeper."

USPTO Transaction History of U.S. Appl. No. 10/460,776, filed Jun. 12, 2003, entitled "Systems and Methods for Arranging a Call," now U.S. Patent No. 7,359,498.

USPTO, Redacted Transaction History of U.S. Appl. No. 08/702,833, filed Aug. 23, 1996, entitled "Method for Establishing Anonymous Communication Links," now U.S. Patent No. 5,907,677.

USPTO, Redacted Transaction History of U.S. Appl. No. 10/923,396, filed Aug. 20, 2004, entitled "Gate Keeper."

USPTO, Redacted Transaction History of U.S. Appl. No. 10/460,776, filed Jun. 12, 2003, entitled "Systems and Methods for Arranging a Call," now U.S. Patent No. 7,359,498.

* cited by examiner

Your Email Address: [____] ← 302
If you've used Keen before please click here

Create Password: [____] ← 304
(6-16 characters)

Re-type Password: [____] ← 306

To talk with Patent-Agent, enter the phone number where you'd like Keen to call you.

308 — Phone Number: ([___]) [___]-[___] ext. [___] (optional) International callers.
(U.S./Canada)

☐ I use the same phone line for receiving telephone calls and connection to the internet.
☐ Email me about special offers and promotions.
☑ I have read and agree to be bound by the terms and conditions of the Member Agreement and the rules and policies referenced therein.

310

When you click Continue, your phone will ring. After your free call, you can add to your Keen account if you wish to continue your call.

[Continue]

300

How this works

FIGURE 3

SYSTEMS AND METHODS FOR ARRANGING A CALL

CROSS-REFERENCE TO RELATED APPLICATIONS

The present application is a continuation application of U.S. patent application Ser. No. 10/460,776, filed Jun. 12, 2003, which is incorporated herein by reference in its entirety.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever.

FIELD OF THE INVENTION

The present invention generally relates to the field of electronic information delivery. More particularly, an embodiment of the present invention provides a technique for arranging a communication channel with a service provider.

BACKGROUND

Currently, consumers interested in acquiring services must first identify the service provider who is capable of providing the required services. This usually means perusing a telephone directory, which can become frustrating and time-consuming if the service providers telephoned are not immediately available. A phone book (whether a bound paper book or an electronic directory) is also not very effective if the service provider's business category is unknown.

The availability of some telephone book services over the Internet has somewhat lessened the time involved in finding a service provider. The present Internet-based, systems, however, fail to address other issues such as facilitating the contact between the consumer and the service provider.

Also, the present services fail to provide a measurable way of deciding which service provider may fit a consumer's needs. For example, there may be many lawyers listed in a telephone book without specifying their expertise or other verifiable information.

Accordingly, with the present solutions, a consumer may have to spend a lot of time to find a service provider, research the service provider's expertise, experience and the like, and establish contact with the selected service provider.

SUMMARY OF THE INVENTION

Novel systems and methods for arranging a call are disclosed. In an embodiment of the present invention, a method of arranging a call with a service provider is disclosed. The method includes: determining whether the service provider accepts arranged calls; if it is determined that the service provider does not accept arranged calls, contacting the service provider to request arranged calls from the service provider; and if it is determined that the service provider accepts arranged calls, requesting an arranged call.

In another embodiment of the present invention, the arranged call request requires provision of one or more items selected from a list comprising a date, a time, a contact type, and a deposit.

In a further embodiment of the present invention, the service provider is contacted to enable the arranged call request by an act selected from a group comprising sending an email, placing a phone call, sending a page, and sending a piece of mail.

In yet another embodiment of the present invention, the arranged call includes an option selected from a group comprising taking a call now, taking a call within a requested period of time, and making an appointment.

In a different embodiment of the present invention, the option is selected by the service provider, a consumer, or both.

In a further embodiment of the present invention, the option is signaled through one or more devices selected from a group comprising telephone, computer, personal digital assistant (PDA), and pager.

BRIEF DESCRIPTION OF THE DRAWINGS

The invention is illustrated by way of example and not limitation in the figures of the accompanying drawings, in which like references indicate similar or identical elements, and in which:

FIG. 3 illustrates an exemplary graphical user interface (GUI) 300 in accordance with an embodiment of the present invention.

DETAILED DESCRIPTION

In the following detailed description of the present invention numerous specific details are set forth in order to provide a thorough understanding of the present invention. However, it will be apparent to one skilled in the art that the present invention may be practiced without these specific details. In other instances, well-known structures and devices are shown in block diagram form, rather than in detail, in order to avoid obscuring the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

In addition, select embodiments of the present invention include various operations, which are described herein. The operations of the embodiments of the present invention may be performed by hardware components or may be embodied in machine-executable instructions, which may be in turn utilized to cause a general-purpose or special-purpose processor, or logic circuits programmed with the instructions to perform the operations. Alternatively, the operations may be performed by a combination of hardware and software.

Moreover, embodiments of the present invention may be provided as computer program products, which may include machine-readable medium having stored thereon instructions used to program a computer (or other electronic devices) to perform a process according to embodiments of the present invention. The machine-readable medium may include, but is not limited to, floppy diskettes, optical disks, compact disc-read only memories (CD-ROMs), and magneto-optical disks, read-only memories (ROMs), random-access memories (RAMs), erasable programmable ROMs (EPROMs), electrically EPROMs (EEPROMs), magnetic or optical cards, flash memory, or other types of media or machine-readable medium suitable for storing electronic instructions and/or data.

Additionally, embodiments of the present invention may be downloaded as a computer program product, wherein the program may be transferred from a remote computer (e.g., a server) to a requesting computer (e.g., a client) by way of data signals embodied in a carrier wave or other propagation medium via a communication link (e.g., a modem or network connection). Accordingly, herein, a carrier wave shall be regarded as comprising a machine-readable medium.

Figure 1:
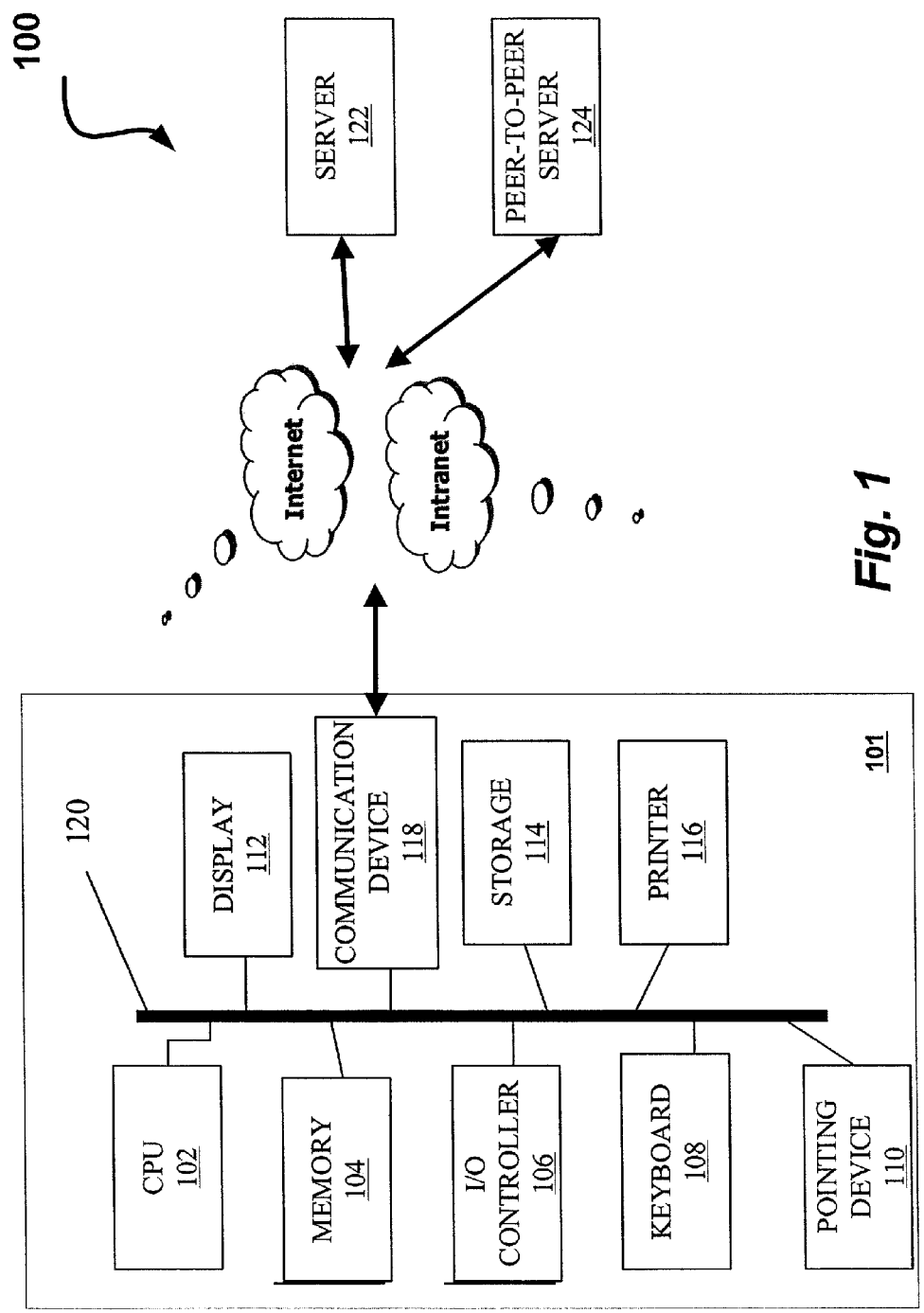
FIG. 1 is a simplified exemplary block diagram of a computer system in which the present invention may be embodied.

FIG. 1 illustrates an exemplary block diagram of a computer system 100 in accordance with an embodiment of the present invention. It is envisioned that the computer system 100 may be utilized to implement various embodiments of the present invention. The system 100 includes a computer 101 which in turn includes a central processing unit (CPU) 102, a main memory 104, an input/output controller 106, a keyboard 108, a pointing device 110 (e.g., mouse, track ball, pen device, or the like), a display device 112, and a mass storage 114 (e.g., hard disk, optical drive, or the like). Additional input/output devices, such as a printing device 116, may be included in the computer 101 as desired.

A communication device 118 may provide access to online services for example via the Internet or an intranet. The communication device 118 can be selected from a variety of devices such as an analog modem, a network card such as an Ethernet, Fast Ethernet, and Token Ring, a digital modem such as a digital subscriber line (DSL) and its varieties such as asynchronous DSL (ADSL), a wireless modem, and the like. The connection to the Internet and/or an intranet may provide access to a server 122 which can be any type of a server including a web server, file transfer protocol (FTP) server, Novell server, Microsoft Windows-based servers, and the like.

As shown in FIG. 1, access to a peer-to-peer server 124 may also be provided through the Internet and/or an intranet. As illustrated, the various components of the computer 101 may communicate through a system bus 120 or similar architecture. In an embodiment, the computer system 100 includes an IBM-compatible personal computer utilizing an Intel microprocessor, which is available from several vendors (including IBM of Armonk, N.Y.). Those with ordinary skill in the art understand that any type of computer system may be utilized to embody the present invention, including those made by Hewlett Packard of Palo Alto, Calif. Also, instead of a single processor, two or more processors can be utilized to provide speedup in operations.

Figure 2:
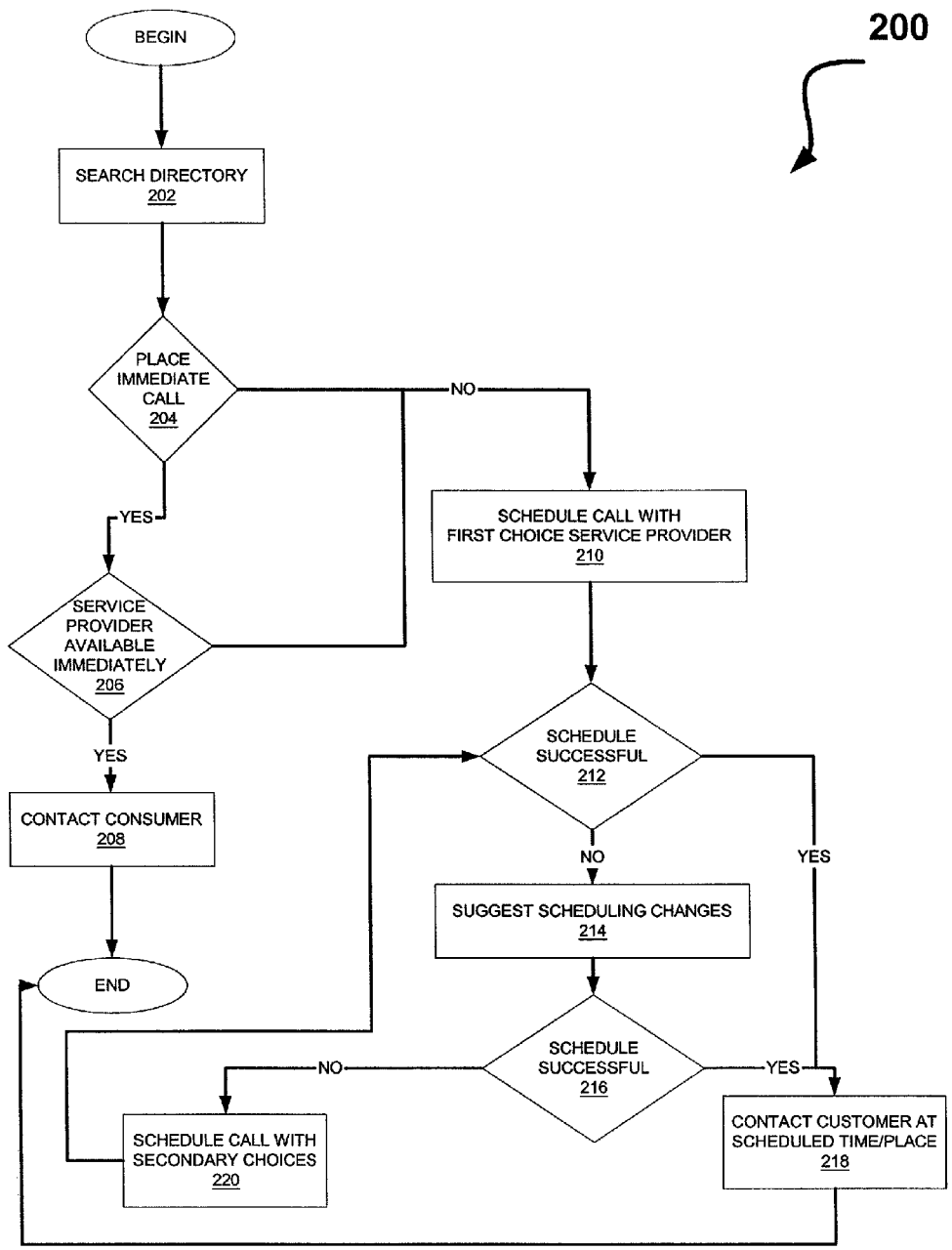
FIG. 2 illustrates an exemplary flow diagram of a service provider contact facilitation method 200 in accordance with an embodiment of the present invention.

FIG. 2 illustrates an exemplary flow diagram of a service provider contact facilitation method 200 in accordance with an embodiment of the present invention. The method 200 starts in a stage 202, which allows a consumer having access to a server (such as those discussed with reference to FIG. 1) to search a directory of service providers. In an embodiment of the present invention, the directory may include information regarding the service providers' experience, background, availability, preferences, and reviews (e.g., done by impartial third parties, previous consumers, entities specializing in verifying background information, and the like).

In one or more embodiments of the present invention, the following techniques may be utilized to search for a service provider:

to receive advice on a particular topic, a predefined category may be selected by a consumer (e.g., which may further identify topics, and subtopics);

a search engine may be utilized by typing in the word or words that best describe the subject for which the consumer wishes to receive advice; and/or a search may also be done for specific advisors by typing their name (e.g., member name, real name, expertise, and the like).

It is envisioned that the search may be performed using Boolean, case-sensitive, wildcard-based, and the like. Once a consumer selects a service provider, a stage 204 determines whether the consumer would like to place an immediate call to the service provider. If it is determined that an immediate contact is requested, a stage 206 determines whether the selected service provider is available immediately. If the service provider is available immediately, the consumer is contacted in a stage 208 and the method 200 terminates. In accordance with an embodiment of the present invention, the immediate contact is established by a telephone call, an instant messenger, a videoconference, or the like.

In one embodiment of the present invention, the contact (208) may be established by calling the consumer after the consumer elects a call now option. The call may be placed through a regular phone system, over the Internet, a cellular phone, and the like. If the consumer's phone is busy, the system (such as that discussed with reference to FIG. 1, including the servers 122 and 124) may retry for a select number of times. A failure may be followed up with form of notification to the consumer such as an email, a voice call, a voicemail, a page, and/or an instant message. If a consumer only has a single phone line, the consumer may be instructed to hang up to receive the call in accordance with an embodiment of the present invention. In another embodiment of the present invention, after the consumer receives the call, the consumer may be prompted to press a code (such as a digit or name) to acknowledge the consumer's intention to pay for the service provider's time.

In yet another embodiment of the present invention, a recorded advice may be offered to the consumer instead of a live one for example, for a recipe, specific information, recurring advise, and the like. Moreover, provision of a recorded advice is envisioned to be especially beneficial in situations where live advice is unavailable (for example due to the time of day or a quiet period identified by, for example, the service provider). In a different embodiment of the present invention, the consumer can replay a recorded advice without incurring additional charges.

In a further embodiment of the present invention, the availability of the service provider (206) is determined by contacting the service provider through voice call, voice mail, email, and the like. Once the availability of the service provider is successfully determined, a call (or other communication channel such as those discussed herein) may be established in accordance with the stage 208.

In accordance with another embodiment of the present invention, the service provider is envisioned to be in control of his/her contact (e.g., giving out home number, cell number, email address, etc.). The computer system may manage the specifics such as the phone numbers. In other words, the service provider may maintain his/her persona as a system entity instead of having to give out number, emails, etc. For example, if the service provider decides to drive somewhere, he/she may inform the system that his/her contact phone number should be his/her cell phone number for the next one hour and then the service provider will be unavailable or available at a different contact number, location, and so on.

Such a solution is envisioned to also maintain certain sensitive information protected. For example, for personal matching services, a partner may not want to provide his/her home number to everybody who is interested in establishing contact with that person.

In one embodiment of the present invention, the consumer joins a service to obtain access to service providers. The information required to join may include any combination of the following: an email address, a password, a phone number, whether the same phone number is used for accessing the Internet (i.e., a single phone line), and/or various option such as interest in receiving future mailings or information, agreeing with terms and conditions of a contract, and the like.

FIG. 3 illustrates an exemplary graphical user interface (GUI) 300 in accordance with an embodiment of the present invention. The GUI 300 may be utilized to join a service to obtain access to service providers. The GUI 300 includes an email field 302, a password field 304, a password verification field 306, a phone number field 308, and various option buttons 310. After the consumer has successfully entered the requested data into the fields 302-310, the consumer may select the continue button 312 to proceed with the call (e.g., the stage of 208 of FIG. 2).

In a further embodiment of the present invention, the consumer contact (the stage 208 of FIG. 2) is established by emailing the consumer, visiting the consumer in person at the consumer's location, the service provider meeting the consumer at a determined location, and the like.

Referring back to FIG. 2, if the stage 204 determines that the consumer has not requested an immediate call or the stage 206 determines that the service provider is unavailable immediately, the method 200 resumes in a stage 210, which schedules a call with the selected service provider. In a stage 212, it is determined whether the scheduling of the stage 210 has been successful. If the scheduling has been successful, a stage 218 facilitates the contact with the consumer and the method 200 terminates. Otherwise, a stage 214 suggests scheduling changes.

After the stage 214, a stage 216 determines whether the scheduling was successful. If the stage 214 is successful, the method 200 resumes with the stage 218. Otherwise, a stage 220 suggests scheduling contact with a different service provider. In an embodiment of the present invention, the secondary choice of a different service provider may be made by the consumer during the original search (stage 202). Alternatively, the consumer may be directed (at stage 220) to select a secondary choice. After the stage 220, the method 200 returns to the stage 212.

Figure 4:
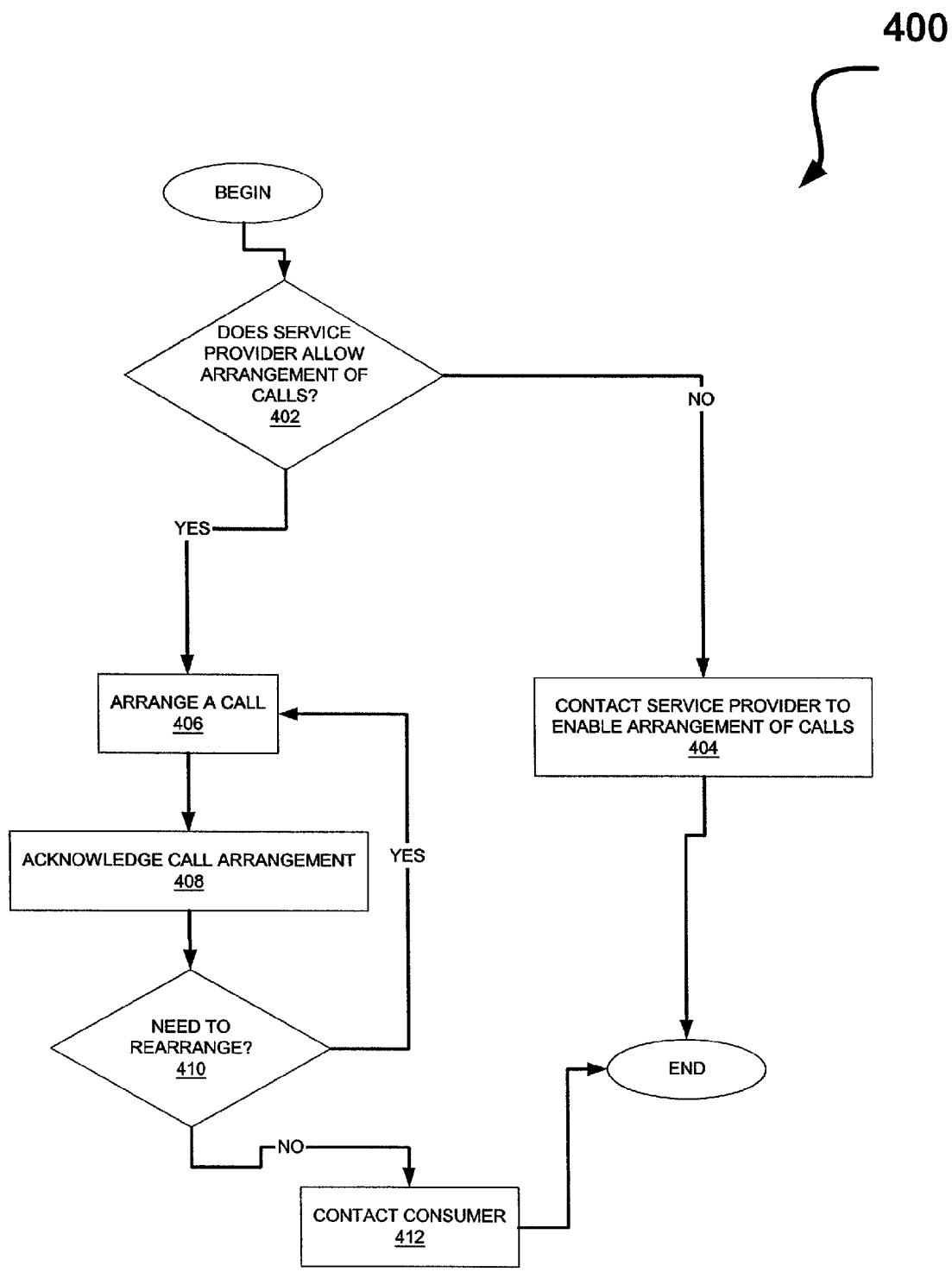
FIG. 4 illustrates an exemplary flow diagram of a method 400 for arranging a call with a service provider in accordance with an embodiment of the present invention.

FIG. 4 illustrates an exemplary flow diagram of a method 400 for arranging a call with a service provider in accordance with an embodiment of the present invention. In one embodiment of the present invention, the method 400 can be utilized to perform the stage 210 discussed with reference to FIG. 2 (e.g., upon the stage 206 determining that the service provider is unavailable immediately).

The method 400 starts with a stage 402, which determines whether a selected service provider (such as discussed with reference to FIG. 2) allows arrangement of calls. If the service provider does not allow call arrangement, a stage 404 permits the consumer to contact the service provider to request enablement of the service provider's call arrangement option. In an embodiment of the present invention, the stage 404 can be performed by sending an email, placing a call, sending a piece of mail, and the like. The method 400 terminates after the stage 404 and may be resumed once the service provider has enabled arrangement of calls.

If it is determined in the stage 402 that the service provider does allow for arrangement of calls, a stage 406 arranges a call. In an embodiment of the present invention, the stage 406 is performed by selecting a button on a web server (such as that discussed with respect to FIG. 1). Upon a consumer requesting a call arrangement, one or more of the following items may be requested or performed:

request a date and time for the call (e.g., by displaying available dates and times for the service provider, for example, by accessing the service provider's calendar, by requesting a specific date and time, requesting a call within a specified period (e.g., within two hours, four hours, etc.), and the like);

verifying the consumer's point of contact (e.g., telephone number, email address, address, and the like); and/or placing a deposit if necessary to reserve the appointment with the service provider (or adding more money to the consumer's account to enable a longer call).

In one embodiment of the present invention, the stage 406 is performed by sending a message (e.g., via telephone, email, page, and the like) to the service provider indicating that a consumer is waiting for the service provider contact. It is envisioned that at this point the requesting consumer may be placed in a queue (such as a first in first out queue). Alternatively, the same message or a second message may permit the service provider to manage the queue of consumers who have requested a call with the service provider.

In accordance with an embodiment of the present invention, many customers may line up to contact one service provider. The service provider may have visibility into his/her queue and may have functionality to let him/her take action based on the queue. The action might be to make him/herself available, re-order the queue, pick a valuable customer from the middle, and the like. In a further embodiment of the present invention, the service provider may be notified in accordance with the service provider's preferences. For example, the service provider may only be available during certain periods (or unavailable during quiet periods).

The method 400 continues with a stage 408, which acknowledges the arranged call made after the service provider has either accepted the suggested appointment or the appointment has been made for a period when the service provider has indicated he/she is available. Alternatively, the stage 408 may confirm that the arranged call has been made in accordance with the consumer's requested time and if the service provider becomes available at that time, the call will be placed (412).

In another embodiment of the present invention, the confirmation includes other information such as how long the consumer may be in contact with the service provider during the call (e.g., by determining how much money the consumer has on deposit and the service provider's rate), offer the consumer to add more money to his/her account, the contact number or location for the arranged call, and the like. It is envisioned that the acknowledgement may be made by contacting the consumer and/or service provider, for example, via email, a phone call, a page, and/or mail.

A stage 410 then determines whether there is a need to rearrange the acknowledged arranged call. In an embodiment of the present invention, the rearrangement may only be allowed within a period preceding the arranged call of the stage 408. For example, rearranging may only be allowed less than 24 hours prior to the arranged call. Alternatively, a penalty may apply for rearranging after a prescribed period. If the rearrangement is to be performed, the method 400 resumes at the stage 406. Otherwise, the consumer is contacted at the scheduled time (such as discussed with reference to FIG. 2) and the method 400 terminates.

In yet a further embodiment of the present invention, the service provider may be given options at the stage 406, such as responding to the consumer with a different time period (e.g., service provider will be unavailable within the requested time period but would be available now or agreeing to take the call at the requested time but offering an different time), agreeing to take the call immediately, or suggesting to the consumer to view the service provider's calendar for a different date. It is envisioned that the service provider may signal his availability and/or response through a phone keypad, computer, two-way pager, PDA, and the like.

In a different embodiment of the present invention, contact between the service provider and the consumer fails to be established, a message is sent to the consumer (e.g., via telephone, email, page, etc.) to indicate that either the service provider did not become available or was busy on other calls during the requested time. The consumer may then be given an option to try again to arrange a call with that service provider or contact another service provider (e.g., the stage 220 of FIG. 2).

In a further embodiment of the present invention, if the deadline has already passed, the service provider can follow up by sending a free minutes offer or a message (e.g., via phone, email, page, etc.) to the consumer to encourage contact at another time.

Whereas many alterations and modifications of the present invention will no doubt become apparent to a person of ordinary skill in the art after having read the foregoing description, it is to be understood that any particular embodiment shown and described by way of illustration is in no way intended to be considered limiting. For example, the techniques discussed with reference to various embodiments herein may be applied to any matching process such as matching singles, business or personal partners, buyers and sellers, and the like. Additionally, the communications established herein may be arranged through video sessions, chat sessions, and the like. Therefore, references to details of various embodiments are not intended to limit the scope of the claims which in themselves recite only those features regarded as essential to the invention.

The invention claimed is:

1. A method implemented in a data processing system, the method comprising:
   providing a list of entities for presentation to a user;
   in response to a selection of an entity from the list, determining whether the entity is currently available for a connection for real time communication between the user and the entity;
   if the entity is not currently available for the connection for real time communication between the user and the entity, determining whether the entity allowed the data processing system to schedule a connection for real time communication with the entity; and
   if the elected entity did not allow the data processing system to schedule a connection for real time communication with the entity, requesting the entity to allow the data processing system to schedule the connection for real time communication between the user and the entity.

2. The method of claim 1, wherein the connection for real time communication between the user and the entity comprises a telephonic connection between the user and the entity.

3. The method of claim 2, wherein the determining of whether the entity is currently available for the connection for real time communication between the user and the entity comprises a phone call between the data processing system and the entity.

4. The method of claim 1, wherein if the entity allowed the data processing system to schedule a connection for real time communication with the entity, the method further comprising:
   receiving a date and time from the user; and
   scheduling a connection for real time communication between the user and the entity according to the date and time received from the user.

5. The method of claim 4, further comprising:
   presenting to the entity a queue of users lined up for real time communication with the entity.

6. The method of claim 5, further comprising:
   in response to a presentation of the queue, receiving from the entity an input indicating that the entity is currently available for a connection for real time communication.

7. The method of claim 5, further comprising:
   re-ordering the queue according to an input received from the entity.

8. The method of claim 7, wherein the input received from the entity comprises the entity selecting a user from the queue.

9. The method of claim 4, farther comprising:
   notifying the entity according to a preference of the entity.

10. The method of claim 9, wherein the preference is based on one or more quiet periods specified by the entity.

11. The method of claim 4, further comprising:
   acknowledging to the user after the entity accepts an appointment to schedule the connection according to the date and time received from the user.

12. The method of claim 11, further comprising:
   providing information to the user to indicate a duration limit for the connection scheduled according to the date and time received from the user.

13. The method of claim 4, wherein the scheduling of the connection is based on an item of the entity.

14. The method of claim 13, wherein the item is a calendar of the entity.

15. The method of claim 4, wherein the scheduling of the connection is based on a deposit of the user to reserve an appointment for the scheduled connection for real time communication between the user and the entity.

16. The method of claim 1, wherein the requesting the entity to allow the data processing system to schedule the connection for real time communication between the user and the entity is via email, phone call, page, or a piece of mail.

17. The method of claim 1, wherein the entity is requested, via a phone call to the entity, to allow the data processing system to schedule the connection between the user and the entity for real time communication.

18. The method of claim 1, further comprising the data processing system placing a phone call to the entity to establish the scheduled connection for real time communication between the user and the entity.

19. A tangible computer readable medium storing instructions, the instructions causing a data processing system to perform a method, the method comprising:
   providing a list of entities for presentation to a user;
   in response to a selection of an entity from the list, determining whether the entity is currently available for a connection for real time communication between the user and the entity;
   if the entity is not currently available for the connection for real time communication between the user and the entity, determining whether the entity allowed the data processing system to schedule a connection for real time communication with the entity; and if the elected entity did not allow the data processing system to schedule a connection for real time communication with the entity, requesting the entity to allow the data processing system to schedule the connection for real time communication between the user and the entity.

20. A data processing system, comprising:

means for providing a list of entities for presentation to a user;

means for determining, in response to a selection of an entity from the list, whether the entity is currently available for a connection for real time communication between the user and the entity;

means for determining whether the entity allowed the data processing system to schedule a connection for real time communication with the entity, if the entity is not currently available for the connection for real time communication between the user and the entity; and means for requesting the entity to allow the data processing system to schedule the connection for real time communication between the user and the entity, if the elected entity did not allow the data processing system to schedule a connection for real time communication with the entity.

21. A computer system, comprising:

a processor;

a machine readable medium coupled to the processor, the machine readable medium to store instructions to program the processor; and a communication device coupled to the processor to provide a list of entities for presentation to a user; wherein in response to a selection of an entity from the list, the processor is to determine whether the entity is currently available for a connection for real time communication between the user and the entity; if the entity is not currently available for the connection for real time communication between the user and the entity, the processor is to determine whether the entity allowed the computer system to schedule a connection for real time communication with the entity; and if the elected entity did not allow the data processing system to schedule a connection for real time communication with the entity, the processor is to request the entity to allow the computer system to schedule the connection for real time communication between the user and the entity.

* * * * *